Nov. 1, 1955 — A. ROSENBAUM — 2,722,385
METHOD AND APPARATUS FOR GRINDING EDIBLE VEGETABLE MATERIAL
Filed Oct. 11, 1952 — 4 Sheets-Sheet 1
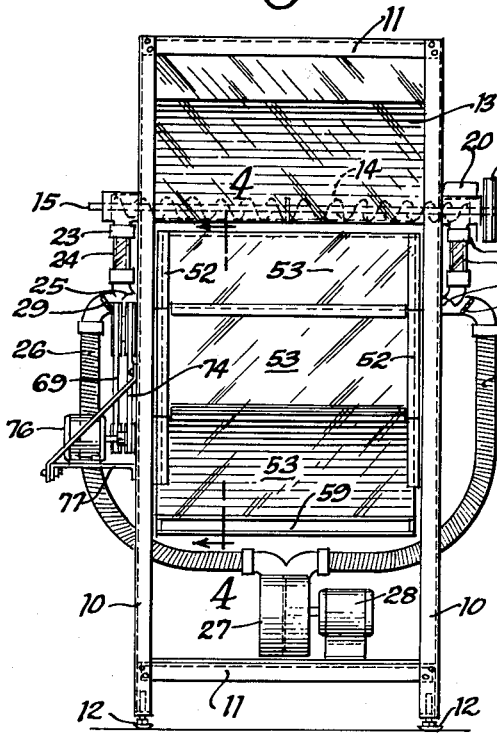
Fig. 1
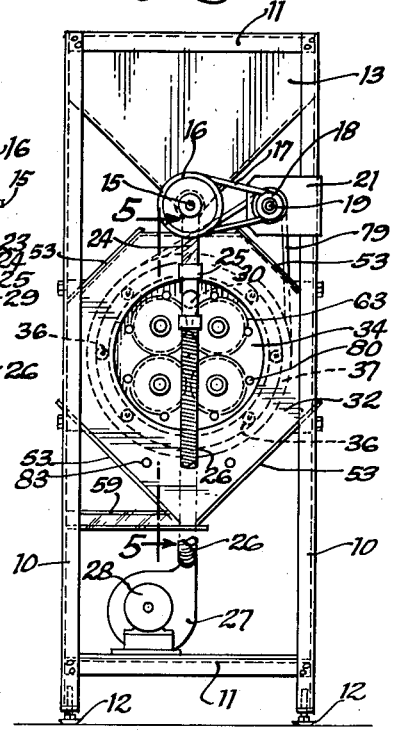
Fig. 2
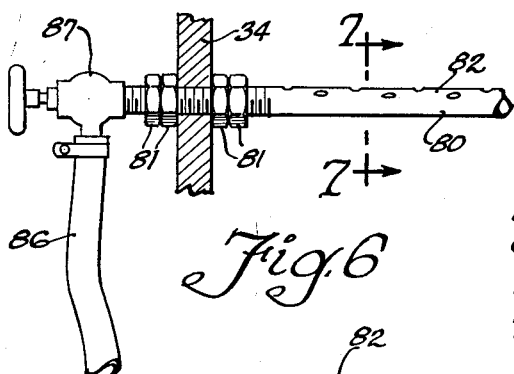
Fig. 6 — Fig. 7
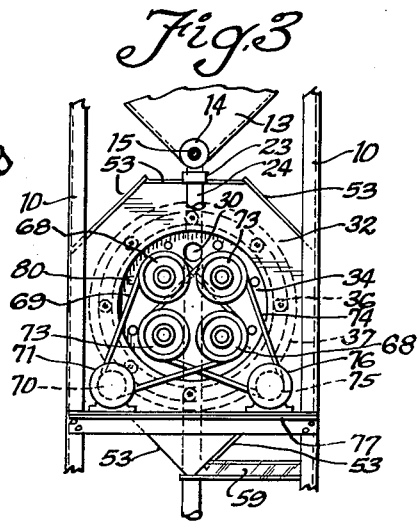
Fig. 3
INVENTOR.
Aaron Rosenbaum
BY
Wallenstein & Spangenberg
Attorneys

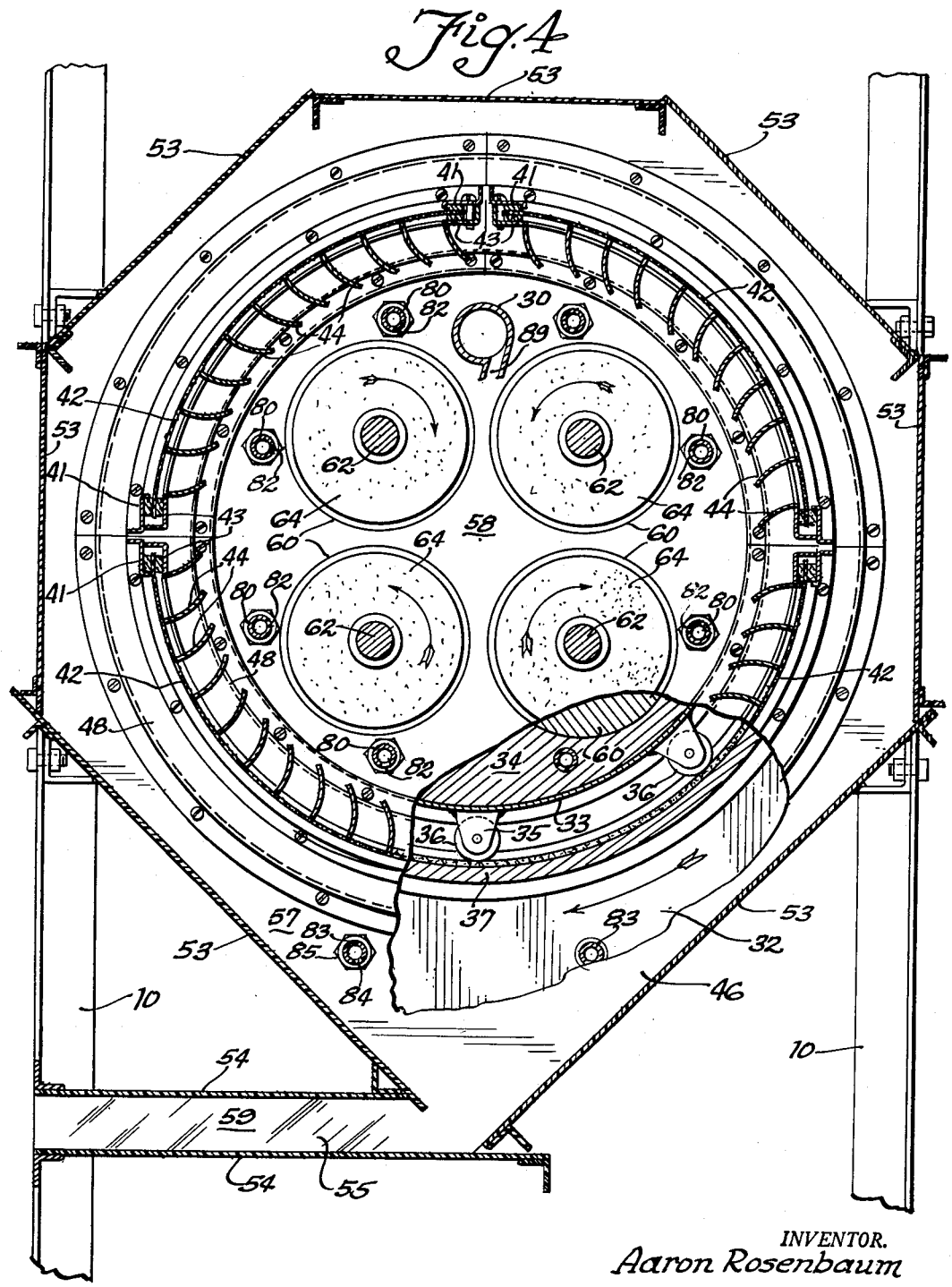

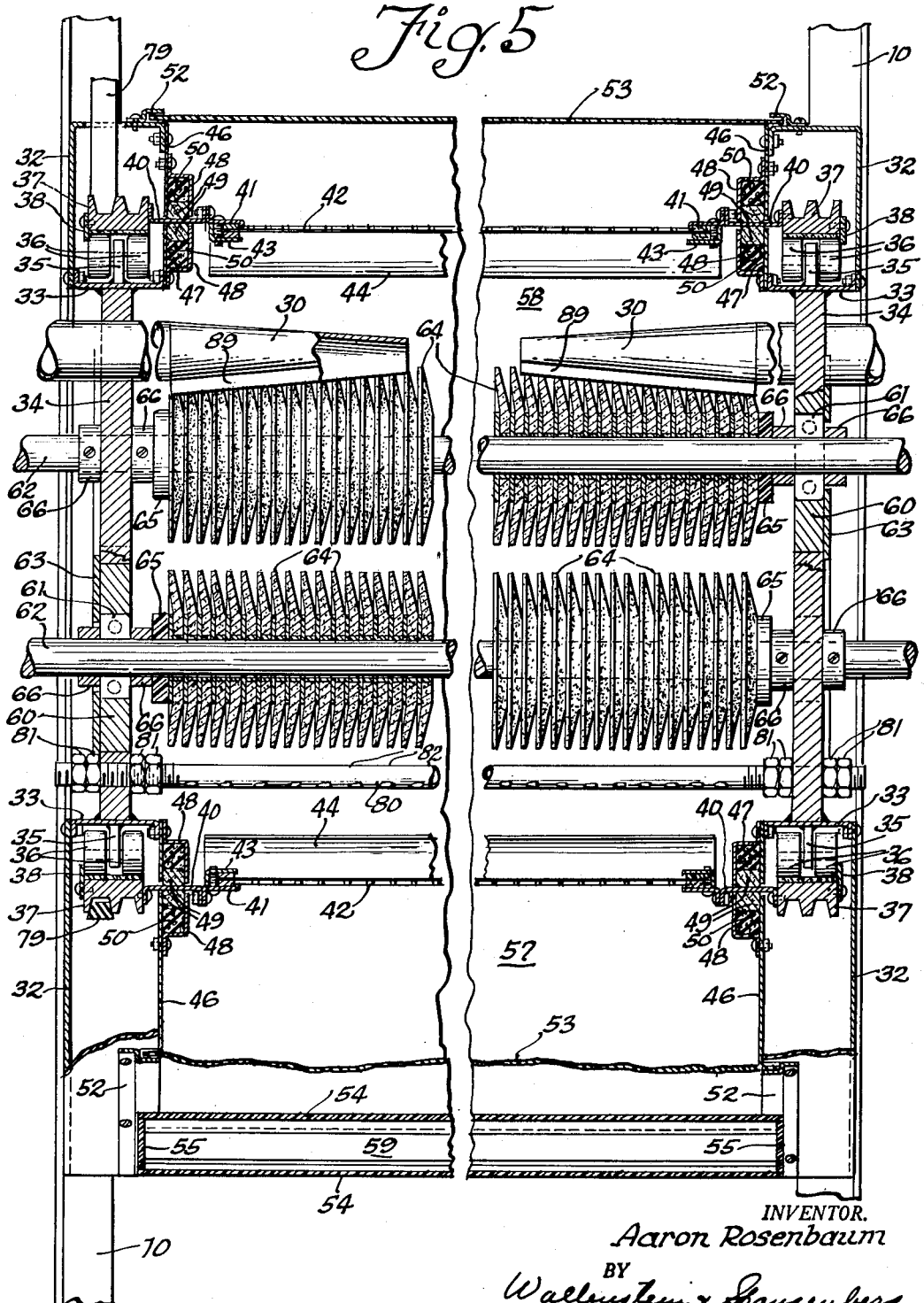

Nov. 1, 1955
A. ROSENBAUM
2,722,385
METHOD AND APPARATUS FOR GRINDING
EDIBLE VEGETABLE MATERIAL
Filed Oct. 11, 1952
4 Sheets-Sheet 4
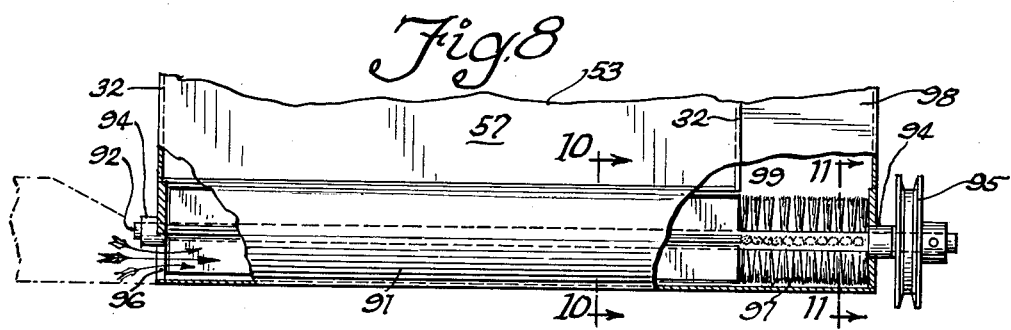
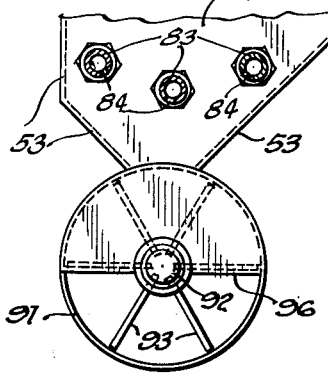
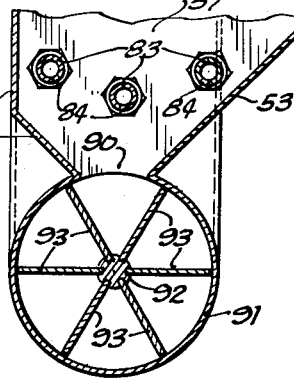
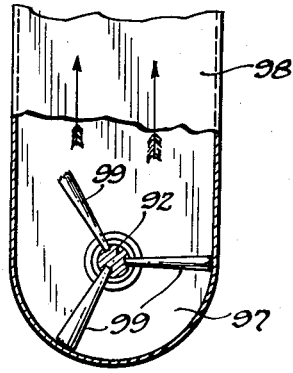
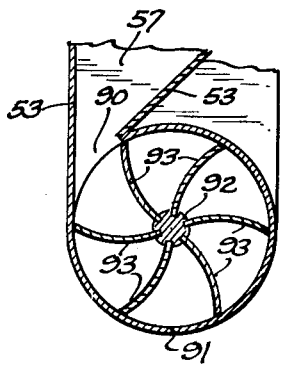
Fig. 12
INVENTOR.
Aaron Rosenbaum
BY
Wallenstein & Spangenberg
Attorneys

United States Patent Office 2,722,385
Patented Nov. 1, 1955

2,722,385

METHOD AND APPARATUS FOR GRINDING EDIBLE VEGETABLE MATERIAL

Aaron Rosenbaum, Chicago, Ill.

Application October 11, 1952, Serial No. 314,277

16 Claims. (Cl. 241—8)

My invention relates to the grinding, disintegrating or pulverizing of edible vegetable materials including cereal grains such as wheat, corn, oats, rye, barley and the like. The following description of my invention will be set forth in relation to the grinding of wheat, where it appears that my invention has perhaps its greatest utility, but it will be understood that many of the significant advantages which are brought out will have at least some applicability to the grinding of various types of cereal grains to convert them into an extremely fine state of subdivision.

The principal objects of this invention are to provide a new and improved method and apparatus for grinding edible vegetable material into a pulverulent condition.

It is well known that, in accordance with conventional milling processes for the production of wheat flour, the bran and the germ of the wheat grains are removed and the flour obtained is devoid of the vitamins, minerals and other valuable constituents which constitute a part of the whole wheat grains. To be sure, whole wheat flours have heretofore been produced and commercially. However, such whole wheat flours, because of the manner of their preparation, have been characterized by a number of properties which, to many people, have been objectionable, and this has militated against their more widespread acceptance and use despite the very important nutritive and health promoting advantages in such products over ordinary wheat flour. In the main, the milling or grinding procedures used heretofore to produce whole wheat flours have involved operations wherein, during the grinding, whether between stones or steel rollers, the grain becomes unduly heated with the result that the flavor, taste and keeping properties of the finished whole wheat flour are markedly impaired.

In accordance with my present invention, significant improvements are obtained in the production of whole wheat flours. These are achieved through the practice of a new grinding process and the utilization of novel and improved grinding apparatus, hereinafter described in detail. Whole wheat flour resulting from the practice of my invention is characterized by excellent color, flavor, taste, keeping properties and the presence of mineral and vitamin values of substantial magnitude, and such flour is well adapted for the production of highly nutritive breads, pancakes and other products normally made from wheat flour.

In general, in accordance with my invention, the wheat grains are preliminarily thoroughly cleaned and foreign and extraneous materials are removed by procedures well known in the art and forming no part of my present invention. The thus prepared wheat grains are fed into a hopper from which they are forcibly discharged in a stream or jet of cool or cold air into a grinding chamber against a series of revolving abrasive wheels. In the particularly preferred embodiments of my invention, a plurality of sets of abrasive wheels is utilized, the abrasive wheels of each respective set rotating in opposite directions. The wheat grains striking the abrasive wheels are, within a short period of time, converted to a fine flour in which the particles of bran and wheat germ are not readily discernible so far as the naked eye is concerned. The grinding chamber is formed within a substantially cylindrical rotating member having a sieve or sieves adjacent which are scoop members which serve to catch and distribute the incompletely ground grain for further contact with the abrasive wheels. This incompletely ground grain is preferably forcibly directed against the abrasive wheels by auxiliary streams or jets of cool or cold air. The grain which is sufficiently finely ground is drawn through the sieve or sieves out of the grinding chamber where it is recovered in any suitable manner as, for instance, through cyclone separators or the like.

Further objects of this invention reside in the details of construction of the apparatus and in the steps of the method, and in the cooperative relationships therebetween.

Other objects and advantages of this invention will become apparent to those skilled in the art upon reference to the accompanying specification, claims and drawings, in which:

Fig. 1 is a front elevational view of one form of a grinding machine made in accordance with this invention;

Fig. 2 is an end elevational view looking from the right of Fig. 1;

Fig. 3 is a partial end elevational view looking from the left of Fig. 1;

Fig. 4 is an enlarged partial vertical sectional view taken substantially along the line 4—4 of Fig. 1;

Fig. 5 is an enlarged partial vertical sectional view taken substantially along the line 5—5 of Fig. 2;

Fig. 6 is an enlarged detail view of one of the elements of the grinding machine;

Fig. 7 is a vertical sectional view taken substantially along the line 7—7 of Fig. 6;

Fig. 8 is an enlarged front elevational view partly in section, of a portion of another form of grinding machine of this invention;

Fig. 9 is an end elevational view looking from the left of Fig. 8;

Fig. 10 is a vertical sectional view taken substantially along the line 10—10 of Fig. 8;

Fig. 11 is a vertical sectional view taken substantially along the line 11—11 of Fig. 8; and Fig. 12 is a view similar to Fig. 10 but illustrating still another form of the grinding machine.

Referring first to Figs. 1 to 3, the grinding machine of this invention includes a supporting stand having uprights 10 of angle iron or the like secured together by cross members 11 also of angle iron or the like. This supporting stand is preferably provided with adjustable feet 12 for leveling the same. The top of the supporting stand carries a feed hopper 13 having converging side walls terminating in a trough in the bottom of the hopper. In this trough there is located a feed distributor 14 having oppositely arranged helical screw feed means separated by a division in the center thereof to effect even distribution whereby to advance the grain or the like in the opposite direction along the bottom of the hopper. The distributor member is carried on a shaft 15 which is provided with a pulley 16. The pulley 16 is driven through a belt 17 by a pulley 18 carried by a motor shaft 19 of a motor 20 mounted on a bracket 21 secured to the supporting stand. As the motor 20 is operated the feed distributor member 14 is rotated for distributing the grain in opposite directions along the bottom of the hopper 13. The rate of advance of the grain may be regulated by adjusting the speed of the motor 20.

The ends of the feed distributor member 14 discharge grain or the like into fittings 23 which are connected by pipes 24 preferably made of transparent material into fittings 25. The transparent pipes 24 provide for inspection of the grain. The fittings 25 are connected by conduits 26 to the discharge side of a blower 27 driven by an electric motor 28, the blower and motor being carried by the supporting frame. As the motor 28 is operated, air under pressure is blown through the conduits 26 and fittings 25 into nozzles or jets 30 located within the machine. The air or other gas passing through the fittings 25 entrains grain from the transparent pipes 24 and delivers the grain to the interior of the grinding machine. The rate at which the air is supplied may be regulated by adjusting the valves 29 in the fittings 25.

Referring now also to Figs. 4 and 5, the upright members 10 have secured thereto a pair of outer end plates 32 of multi-sided configuration. These outer end plates 32 are each provided with a central opening in which an inwardly extending rim 33 is secured, as by means of nuts and bolts. Each rim 33 centrally carries a circular plate 34, the plate being secured thereto as by welding. Each rim 33 is also externally provided with a plurality of circumferentially spaced brackets 35, each bracket 35 carrying a pair of rollers 36. A pair of rings 37 are rotatably mounted on the rollers 36 and are maintained on the rollers by means of guide rings 38 secured to the rings 37.

Each ring 37 is provided with a rim 40 which in turn carries frame members 41. A plurality of sieves 42 is carried in the frame members 41 by frame members 43 secured thereto by screws. The frame members 43 carry a plurality of inwardly extending scoops 44. There is thus provided a substantially cylindrical sieve member substantially horizontally and rotatably mounted on the rollers 36 by means of the rings 37. The screens may be readily interchanged for screens of different mesh. The rotatable sieve member also includes the inwardly projecting scoops 44.

Spaced inwardly from the outer end walls 32 are inner end walls 46, each of which is provided with an enlarged central opening for rotatably receiving the rims 40 carried by the rings 37. Each stationary rim 33 inwardly carried an inner end wall 47 which is received within the rotatable rim 40. Each inner end wall 46 and 47 carries an annular member 48 forming annular pockets for receiving felt packing rings 49 backed up by foam rubber rings 50. The felt packing rings 49 are normally stationary and they are urged into engagement with the rotating rim 40 by the foam rubber rings 50, the felt packing rings 49 collaborating with the rings 50 to form seals.

The end plates 32 are each provided with a plurality of guide brackets 52 for receiving a plurality of side plates 53. The side plates 53 cooperate with the end plates 32 for forming an enclosed grinding housing. The side plates 53 are preferably slidably mounted in the brackets 52 so that they may be moved for ready access to the interior of the housing. The various side plates 53 may also be made of a transparent material so as to permit visual inspection of the interior of the housing. Suitable gaskets may be provided for sealing the side plates 53 in the brackets 52. A pair of spaced horizontal plates 54 and a pair of spaced vertical plates 55 extend laterally from the bottom of the grinding housing, these plates forming a discharge passage for the bottom of the grinding housing. Thus in the grinding machine of this invention there is provided a substantially closed grinding housing 57 which encompasses a rotatable sieve member which has provided therein a grinding chamber 58. Grain or other edible vegetable material is introduced into the grinding chamber 58 from the hopper 13 by means of the nozzles 30. Adequately ground grain or the like passes through the sieve member from the grinding chamber 58 into the grinding housing 57, where it is drawn off therefrom through a discharge duct 59.

The large discs 34 at the ends of the machine each carries four smaller discs 60 which in turn carry ball bearings 61 for rotatably mounting four shafts 62 within the grinding chamber 58. The discs 60 are held in place on the large discs 34 by means of suitable clamping rings 63. Each shaft 62 carries a plurality of abrasive wheels 64. The abrasive wheels 64 are preferably dish-shaped and are spaced slightly apart by means of spacers. The abrasive wheels 64 are secured on the shafts 62 by washer members 65 and collars 66. The collars 66 also secure the shafts 62 longitudinally with respect to the bearings 61. It is here noted that the abrasive wheels 64 are slightly smaller in diameter than the discs 60 so that by removing the clamping rings 63 the discs 60, shafts 62 and abrasive wheels 64 may be removed from the grinding machine as a unit.

As shown in Fig. 4, the upper pair of shafts 62 and the abrasive wheels 64 rotated thereby, rotate in opposite directions, that is, toward each other as viewed from the top. The bottom pair of shafts 62 and the abrasive wheels 64 rotated thereby also rotate in opposite directions with respect to each other. Here, however, the abrasive wheels rotate in directions opposite to the directions of the abrasive wheels of the upper pair of shafts 62, namely, away from each other as viewed from the top.

As shown in Fig. 3, one of the upper shafts 62 and one of the lower shafts 62 carry pulleys 68 which are connected together and to a pulley 70 by means of a belt 69, the pulley 70 being driven by an electric motor 71. Thus this motor drives its respective shafts in one direction. In like manner, the other two shafts 62 carry pulleys 73 which are connected together and to a pulley 75 by a belt 74, the pulley 75 being driven by an electric motor 76. Here these other two shafts are driven in the opposite direction by the electric motor 76. The two electric motors 71 and 76 may be supported by a suitable bracket 77 carried by the supporting stand.

The ring members 37 which support and rotatably mount the sieve member within the grinding housing are externally provided with grooves for receiving a belt 79 for rotating the same. The belt 79 extends over a pulley driven by the electric motor 20 carried by the bracket 21 on the supporting stand. Thus as grain or the like is fed from the hopper 13 to the supply nozzles 30 the sieve member is also rotated. At the same time the abrasive wheels 64 are rapidly rotated by the electric motors 71 and 76 and the grain or the like is discharged through the nozzles 30 onto the abrasive wheels 64 to be pulverized thereby.

A plurality of tubes 80 extend between the end discs 34 through the grinding chamber, these pipes 80 being substantially circumferentially arranged within the grinding chamber. These pipes 80 are secured to the end discs 34 by means of nuts and lock nuts 81. These pipes serve to strengthen and add rigidity to the machine. These pipes 80 are also provided with small jet openings 82 for supplying and directing jets or streams of air. The upper ones of the pipes 80 have their stream or jet openings 82 directed toward the abrasive wheels 64. These pipes therefore provide auxiliary jets for directing grain against the abrasive wheels 64 for pulverizing purposes. The lower pipes 80 have their jet openings 82 facing downwardly toward the sieve or screen 42 for the purpose of assisting the adequately pulverized grain in passing through the sieve or screen.

Located below the sieve member and in the grinding housing are further pipes 83 having air jet openings 84 and held in place on the end walls 46 and 32 by nuts 85. These air pipes 83 produce air jets or air streams directed toward the outlet opening of the grinding housing for the purpose of directing and delivering completely ground or pulverized grain to the outlet opening.

Air is supplied to the air pipes in the manner indicated in Figs. 6 and 7. Here air hoses 86 leading from a source of fresh air (not shown) are connected to the various pipes 80 and to the pipes 83 through valves 87. By adjusting the valves 87 the strength of these auxiliary air jets may be individually adjusted. By positioning the pipes 80 in different rotative positions, the directions of these auxiliary air jets may also be varied at will.

The nozzles 30 have jet openings 89 for directing the grain and air against and between the upper abrasive wheels 64. The abrasive wheels 64 are preferably rotated very rapidly, as for example, about 2500 R. P. M. The grain or like edible vegetable material which is forcibly directed by the air jet means against the rapidly rotating abrasive wheels 64 is rapidly pulverized thereby and the grain is contacted against the rotating abrasive wheels 64 again and again until it is completely or adequately pulverized. The sieve member is rotated at a relatively slow speed, as for example, about 5 or 6 R. P. M. The grain which is adequately pulverized is passed through the sieve member and is discharged through the discharge opening of the grinding housing. The grain or the like which is not adequately pulverized is carried upwardly by the scoops 44 of the sieve member and when this grain arrives above the abrasive wheels 64 it is dropped thereon. The auxiliary air jets 82 operate effectively to direct this grain against the abrasive wheels 64 for further pulverizing until the same is adequately pulverized. The air which directs the grain against the abrasive wheels also has a cooling effect and prevents overheating of the grain which would otherwise be caused by the pulverizing action. The air and pulverized grain drawn through the discharge passage 59 from the grinding housing is preferably passed through a cyclone separator for separating the adequately ground grain from the air.

Figs. 8 to 11 illustrate a different manner for withdrawing adequately ground grain or the like from the grinding housing of the grinding machine. Here the bottom of the grinding housing 57 is provided with a longitudinal opening 90 opening into a substantially cylindrical chamber 91. A shaft 92 having radial vanes 93 is journaled in the chamber 91 by means of bearings 94. The outer end of the shaft 94 carries a pulley 95 to be driven through a belt by an electric motor. The ends of the housing 91 are closed with the exception that the lower half of one end is opened as indicated at 96 in Figs. 8 and 9. This provides a straight-through passage through the chamber 91 in the lower half thereof from the opening 96 to the portion 97 of the chamber 91 which communicates with an upwardly extending discharge outlet 98 leading to a cyclone separator or the like. The shaft 92 carries brushes 99 in the brush portion 97 of the cylindrical housing 91 to aid in directing the pulverized grain into the passage 98. As grain is discharged through the opening 90 it is received in the vanes 93 and carried downwardly into the bottom of the cylindrical housing 91. From there the grain is forced longitudinally through the housing 91 by air entering at 96 into the brush portion 97 of the housing. The brushes 99 carry the grain upwardly and direct it into the passage 98 where the grain is drawn by suction into the cyclone separator. The veins 93 therefore act to seal off the discharge opening 90 and yet permit removal of the grain from the grinding housing 57 and delivery of the grain into the passage 98 for delivery to the cyclone separator.

The arrangement of Fig. 12 is like that of Fig. 9 with two major exceptions. One is the precise shape of the vanes 93 carried by the shaft 92 and the other is the precise location of the discharge opening 90 from the grinding housing 57.

In the grinding machine of this invention the grain fed into the grinding chamber is tossed to and fro against the various rapidly rotating grinding wheels by the cool or cold air jets. The grain is thus rapidly abraded by the grinding wheels into a very fine state with all of the elements of the grain including the germ and bran being present. Because of the cool or cold air jets used in directing the grain it is not overheated during the abrading operation so that its vitamin and mineral content is not decreased nor is its flavor, taste and keeping properties impaired. The fine particles of the grain are drawn off quickly through the sieves from the grinding chamber and this effectively eliminates or materially decreases the hazards of explosion and fire. When this very fine whole grain flour produced by this grinding machine is packed in airtight containers and kept in a cool place, all of its essential elements and freshness will be preserved for a considerable length of time. It will be rich in vitamins, minerals and other valuable constituents and rich and full with true flavor and taste.

While for purposes of illustration, one principal form of my invention has been disclosed, other forms thereof may become apparent to those skilled in the art upon reference to this disclosure, and therefore this invention is to be limited only by the scope of the appended claims.

I claim as my invention:

1. A grinding machine for grinding edible vegetable material into a pulverulent condition comprising an enclosed grinding housing, a shaft substantially horizontally and rotatably journaled in the grinding housing, a plurality of abrasive wheels fixedly carried by the shaft for rotation therewith, a substantially cylindrical sieve member substantially horizontally and rotatably journaled in the grinding housing about the rotating abrasive wheels and forming a grinding chamber therein, means for feeding the edible vegetable material into the grinding chamber above and along the rotating abrasive wheels and including gas jet means for forcibly directing the edible vegetable material against the rotating abrasive wheels to be pulverized thereby, the edible vegetable material which has been adequately pulverized passing through the sieve member into the grinding housing and the edible vegetable material not being adequately pulverized remaining in the grinding chamber, means for conveying and distributing the edible vegetable material which has not been adequately pulverized into contact with the rotating abrasive wheels for further pulverizing, and means for withdrawing the adequately pulverized edible vegetable material from the bottom of the enclosed grinding housing.

2. A grinding machine for grinding edible vegetable material into a pulverulent condition comprising an enclosed grinding housing, a plurality of substantially parallel spaced shafts substantially horizontally and rotatably journaled in the grinding housing, a plurality of abrasive wheels fixedly carried by each shaft for rotation therewith, a substantially cylindrical sieve member substantially horizontally and rotatably journaled in the grinding housing about the rotating abrasive wheels and forming a grinding chamber therein, means for feeding the edible vegetable material into the grinding chamber above and along and between the rotating abrasive wheels and including gas jet means for forcibly directing the edible vegetable material against the rotating abrasive wheels to be pulverized thereby, the edible vegetable material which has been adequately pulverized passing through the sieve member into the grinding housing and the edible vegetable material not being adequately pulverized remaining in the grinding chamber, means for conveying and distributing the edible vegetable material which has not been adequately pulverized into contact with the rotating abrasive wheels for further pulverizing, and means for withdrawing the adequately pulverized edible vegetable material from the bottom of the enclosed grinding housing.

3. A grinding machine for grinding edible vegetable material into a pulverulent condition comprising an enclosed grinding housing, an upper pair and a lower pair of substantially parallel spaced shafts substantially horizontally and rotatably journaled in the grinding housing, a plurality of abrasive wheels fixedly carried by each shaft for rotation therewith, means for rotating the shafts of the upper pair in opposite directions toward each other as viewed from above and the shafts of the lower pair in opposite directions away from each other as viewed from above, a substantially cylindrical sieve member substantially horizontally and rotatably journaled in the grinding housing about the rotating abrasive wheels and forming a grinding chamber therein, means for feeding the edible vegetable material into the grinding chamber above and along the upper pair of grinding wheels and including gas jet means for forcibly directing the edible vegetable material against and between the rotating abrasive wheels of the upper pair of shafts for pulverizing the same, the edible vegetable material which has been adequately pulverized passing through the sieve member into the grinding housing and the edible vegetable material not being adequately pulverized remaining in the grinding chamber, means for conveying and distributing the edible vegetable material which has not been adequately pulverized into contact with the rotating abrasive wheels for further pulverizing, and means for withdrawing the adequately pulverized edible vegetable material from the bottom of the enclosed grinding housing.

4. A grinding machine for grinding edible vegetable material into a pulverulent condition comprising an enclosed grinding housing, a shaft substantially horizontally and rotatably journaled in the grinding housing, a plurality of abrasive wheels fixedly carried by the shaft for rotation therewith, a substantially cylindrical sieve member substantially horizontally and rotatably journaled in the grinding housing about the rotating abrasive wheels and forming a grinding chamber therein, means for feeding the edible vegetable material into the grinding chamber above and along the rotating abrasive wheels and including gas jet means for forcibly directing the edible vegetable material against the rotating abrasive wheels to be pulverized thereby, the edible vegetable material which has been adequately pulverized passing through the sieve member into the grinding housing and the edible vegetable material not being adequately pulverized remaining in the grinding chamber, a plurality of scoops inwardly carried by the substantially cylindrical sieve member for carrying upwardly the edible vegetable material which has not been adequately pulverized for distributing the same against the rotating abrasive wheels for further pulverizing, and means for withdrawing the adequately pulverized edible vegetable material from the bottom of the enclosed grinding housing.

5. A grinding machine for grinding edible vegetable material into a pulverulent condition comprising an enclosed grinding housing, a plurality of substantially parallel spaced shafts substantially horizontally and rotatably journaled in the grinding housing, a plurality of abrasive wheels fixedly carried by each shaft for rotation therewith, a substantially cylindrical sieve member substantially horizontally and rotatably journaled in the grinding housing about the rotating abrasive wheels and forming a grinding chamber therein, means for feeding the edible vegetable material into the grinding chamber above and along and between the rotating abrasive wheels and including gas jet means for forcibly directing the edible vegetable material against the rotating abrasive wheels to be pulverized thereby, the edible vegetable material which has been adequately pulverized passing through the sieve member into the grinding housing and the edible vegetable material not being adequately pulverized remaining in the grinding chamber, a plurality of scoops inwardly carried by the substantially cylindrical sieve member for carrying upwardly the edible vegetable material which has not been adequately pulverized for distributing the same against the rotating abrasive wheels for further pulverizing, and means for withdrawing the adequately pulverized edible vegetable material from the bottom of the enclosed grinding housing.

6. A grinding machine for grinding edible vegetable material into a pulverulent condition comprising an enclosed grinding housing, an upper pair and a lower pair of substantially parallel spaced shafts substantially horizontally and rotatably journaled in the grinding housing, a plurality of abrasive wheels fixedly carried by each shaft for rotation therewith, means for rotating the shafts of the upper pair in opposite directions toward each other as viewed from above and the shafts of the lower pair in opposite directions away from each other as viewed from above, a substantially cylindrical sieve member substantially horizontally and rotatably journaled in the grinding housing about the rotating abrasive wheels and forming a grinding chamber therein, means for feeding the edible vegetable material into the grinding chamber above and along the upper pair of grinding wheels and including gas jet means for forcibly directing the edible vegetable material against and between the rotating abrasive wheels of the upper pair of shafts for pulverizing the same, the edible vegetable material which has been adequately pulverized passing through the sieve member into the grinding housing and the edible vegetable material not being adequately pulverized remaining in the grinding chamber, a plurality of scoops inwardly carried by the substantially cylindrical sieve member for carrying upwardly the edible vegetable material which has not been adequately pulverized for distributing the same against the rotating abrasive wheels for further pulverizing, and means for withdrawing the adequately pulverized edible vegetable material from the bottom of the enclosed grinding housing.

7. A grinding machine for grinding edible vegetable material into a pulverulent condition comprising an enclosed grinding housing, a shaft substantially horizontally and rotatably journaled in the grinding housing, a plurality of abrasive wheels fixedly carried by the shaft for rotation therewith, a substantially cylindrical sieve member substantially horizontally and rotatably journaled in the grinding housing about the rotating abrasive wheels and forming a grinding chamber therein, means for feeding the edible vegetable material into the grinding chamber above and along the rotating abrasive wheels and including gas jet means for forcibly directing the edible vegetable material against the rotating abrasive wheels to be pulverized thereby, the edible vegetable material which has been adequately pulverized passing through the sieve member into the grinding housing and the edible vegetable material not being adequately pulverized remaining in the grinding chamber, means for conveying and distributing the edible vegetable material which has not been adequately pulverized into contact with the rotating abrasive wheels for further pulverizing, auxiliary gas jet means circumferentially spaced within the grinding chamber about the rotating abrasive wheels for forcibly directing into contact with the abrasive wheels the edible vegetable material distributed by the conveying and distributing means, and means for withdrawing the adequately pulverized edible vegetable material from the bottom of the enclosed grinding housing.

8. A grinding machine for grinding edible vegetable material into a pulverulent condition comprising an enclosed grinding housing, a plurality of substantially parallel spaced shafts substantially horizontally and rotatably journaled in the grinding housing, a plurality of abrasive wheels fixedly carried by each shaft for rotation therewith, a substantially cylindrical sieve member substantially horizontally and rotatably journaled in the grinding housing about the rotating abrasive wheels and forming a grinding chamber therein, means for feeding the edible vegetable material into the grinding chamber above and along and between the rotating abrasive wheels and including gas jet means for forcibly directing the edible vegetable material against the rotating abrasive wheels to be pulverized thereby, the edible vegetable material which has been adequately pulverized passing through the sieve member into the grinding housing and the edible vegetable material not being adequately pulverized remaining in the grinding chamber, means for conveying and distributing the edible vegetable material which has not been adequately pulverized into contact with the rotating abrasive wheels for further pulverizing, auxiliary gas jet means circumferentially spaced within the grinding chamber about the rotating abrasive wheels for forcibly directing into contact with the abrasive wheels the edible vegetable material distributed by the conveying and distributing means, and means for withdrawing the adequately pulverized edible vegetable material from the bottom of the enclosed grinding housing.

9. A grinding machine for grinding edible vegetable material into a pulverulent condition comprising an enclosed grinding housing, an upper pair and a lower pair of substantially parallel spaced shafts substantially horizontally and rotatably journaled in the grinding housing, a plurality of abrasive wheels fixedly carried by each shaft for rotation therewith, means for rotating the shafts of the upper pair in opposite directions towards each other as viewed from above and the shafts of the lower pair in opposite directions away from each other as viewed from above, a substantially cylindrical sieve member substantially horizontally and rotatably journaled in the grinding housing about the rotating abrasive wheels and forming a grinding chamber therein, means for feeding the edible vegetable material into the grinding chamber above and along the upper pair of grinding wheels and including gas jet means for forcibly directing the edible vegetable material against and between the rotating abrasive wheels of the upper pair of shafts for pulverizing the same, the edible vegetable material which has been adequately pulverized passing through the sieve member into the grinding housing and the edible vegetable material not being adequately pulverized remaining in the grinding chamber, means for conveying and distributing the edible vegetable material which has not been adequately pulverized into contact with the rotating abrasive wheels for further pulverizing, auxiliary gas jet means circumferentially spaced within the grinding chamber about the rotating abrasive wheels for forcibly directing into contact with the abrasive wheels the edible vegetable material distributed by the conveying and distributing means, and means for withdrawing the adequately pulverized edible vegetable material from the bottom of the enclosed grinding housing.

10. A grinding machine for grinding edible vegetable material into a pulverulent condition comprising an enclosed grinding housing, a shaft substantially horizontally and rotatably journaled in the grinding housing, a plurality of abrasive wheels fixedly carried by the shaft for rotation therewith, a substantially cylindrical sieve member substantially horizontally and rotatably journaled in the grinding housing about the rotating abrasive wheels and forming a grinding chamber therein, means for feeding the edible vegetable material into the grinding chamber above and along the rotating abrasive wheels and including a gas jet means for forcibly directing the edible vegetable material against the rotating abrasive wheels to be pulverized thereby, the edible vegetable material which has been adequately pulverized passing through the sieve member into the grinding housing and the edible vegetable material not being adequately pulverized remaining in the grinding chamber, a plurality of scoops inwardly carried by the substantially cylindrical sieve member for carrying upwardly the edible vegetable material which has not been adequately pulverized for distributing the same against the rotating abrasive wheels for further pulverizing, auxiliary gas jet means circumferentially spaced within the grinding chamber about the rotating abrasive wheels for forcibly directing into contact with the abrasive wheels the edible vegetable material distributed by the scoops, and means for withdrawing the adequately pulverized edible vegetable material from the bottom of the enclosed grinding housing.

11. A grinding machine for grinding edible vegetable material into a pulverulent condition comprising an enclosed grinding housing, a plurality of substantially parallel spaced shafts substantially horizontally and rotatably journaled in the grinding housing, a plurality of abrasive wheels fixedly carried by each shaft for rotation therewith, a substantially cylindrical sieve member substantially horizontally and rotatably journaled in the grinding housing about the rotating abrasive wheels and forming a grinding chamber therein, means for feeding the edible vegetable material into the grinding chamber above and along and between the rotating abrasive wheels and including gas jet means for forcibly directing the edible vegetable material against the rotating abrasive wheels to be pulverized thereby, the edible vegetable material which has been adequately pulverized passing through the sieve member into the grinding housing and the edible vegetable material not being adequately pulverized remaining in the grinding chamber, a plurality of scoops inwardly carried by the substantially cylindrical sieve member for carrying upwardly the edible vegetable material which has not been adequately pulverized for distributing the same against the rotating abrasive wheels for further pulverizing, auxiliary gas jet means circumferentially spaced within the grinding chamber about the rotating abrasive wheels for forcibly directing into contact with the abrasive wheels the edible vegetable material distributed by the scoops, and means for withdrawing the adequately pulverized edible vegetable material from the bottom of the enclosed grinding housing.

12. A grinding machine for grinding edible vegetable material into a pulverulent condition comprising an enclosed grinding housing, an upper pair and a lower pair of substantially parallel spaced shafts substantially horizontally and rotatably journaled in the grinding housing, a plurality of abrasive wheels fixedly carried by each shaft for rotation therewith, means for rotating the shafts of the upper pair in opposite directions toward each other as viewed from above and the shafts of the lower pair in opposite directions away from each other as viewed from above, a substantially cylindrical sieve member substantially horizontally and rotatably journaled in the grinding housing about the rotating abrasive wheels and forming a grinding chamber therein, means for feeding the edible vegetable material into the grinding chamber above and along the upper pair of grinding wheels and including gas jet means for forcibly directing the edible vegetable material against and between the rotating abrasive wheels of the upper pair of shafts for pulverizing the same, the edible vegetable material which has been adequately pulverized passing through the sieve member into the grinding housing and the edible vegetable material not being adequately pulverized remaining in the grinding chamber, a plurality of scoops inwardly carried by the substantially cylindrical sieve member for carrying upwardly the edible vegetable material which has not been adequately pulverized for distributing the same against the rotating abrasive wheels for further pulverizing, auxiliary gas jet means circumferentially spaced within the grinding chamber about the rotating abrasive wheels for forcibly directing into contact with the abrasive wheels the edible vegetable material distributed by the scoops, and means for withdrawing the adequately pulverized edible vegetable material from the bottom of the enclosed grinding housing.

13. A grinding machine for grinding edible vegetable material into a pulverulent condition comprising an enclosed grinding housing, a shaft substantially horizontally and rotatably journaled in the grinding housing, a plurality of abrasive wheels fixedly carried by the shaft for rotation therewith, a substantially cylindrical sieve member substantially horizontally and rotatably journaled in the grinding housing about the rotating abrasive wheels and forming a grinding chamber therein, means for feeding the edible vegetable material into the grinding chamber above and along the rotating abrasive wheels and including gas jet means for forcibly directing the edible vegetable material against the rotating abrasive wheels to be pulverized thereby, the edible vegetable material which has been adequately pulverized passing through the sieve member into the grinding housing and the edible vegetable material not being adequately pulverized remaining in the grinding chamber, means for conveying and distributing the edible vegetable material which has not been adequately pulverized into contact with the rotating abrasive wheels for further pulverizing, means adjacent the bottom of the enclosed grinding housing for withdrawing the adequately pulverized edible vegetable material therefrom, and auxiliary gas jet means in the lower portion of the grinding housing for directing the adequately pulverized edible vegetable material toward the withdrawing means.

14. A grinding machine for grinding edible vegetable material into a pulverulent condition comprising an enclosed grinding housing, a shaft substantially horizontally and rotatably journaled in the grinding housing, a plurality of abrasive wheels fixedly carried by the shaft for rotation therewith, a substantially cylindrical sieve member substantially horizontally and rotatably journaled in the grinding housing about the rotating abrasive wheels and forming a grinding chamber therein, means for feeding the edible vegetable material into the grinding chamber above and along the rotating abrasive wheels and including gas jet means for forcibly directing the edible vegetable material against the rotating abrasive wheels to be pulverized thereby, the edible vegetable material which has been adequately pulverized passing through the sieve member into the grinding housing and the edible vegetable material not being adequately pulverized remaining in the grinding chamber, means for conveying and distributing the edible vegetable material which has not been adequately pulverized into contact with the rotating abrasive wheels for further pulverizing, auxiliary gas jet means circumferentially spaced within the grinding chamber about the rotating abrasive wheels for forcibly directing into contact with the abrasive wheels the edible vegetable material distributed by the sieve member, means adjacent the bottom of the enclosed grinding housing for withdrawing the adequately pulverized edible vegetable material therefrom, and auxiliary gas jet means in the lower portion of the grinding housing for directing the adequately pulverized edible vegetable material toward the withdrawing means.

15. A process for dry grinding edible vegetable material to produce an improved pulverulent edible material therefrom in a grinding machine having a grinding chamber within which is supported at least one set of rotating abrasive wheels and about which is located a sieve member, comprising the steps of forcibly projecting the edible vegetable material in a forced jet of a gas against the rotating abrasive wheels to be pulverized thereby, continuously passing the edible vegetable material which has been adequately pulverized from the grinding chamber through the sieve member and retaining the edible vegetable material which has not been adequately pulverized within the grinding chamber, continuously conveying the edible vegetable material which has not been adequately pulverized and distributing the same against the rotating abrasive wheels for further pulverizing, and collecting the edible vegetable material which has been adequately pulverized and passed through the sieve member.

16. A process for dry grinding edible vegetable material to produce an improved pulverulent edible material therefrom in a grinding machine having a grinding chamber within which is supported at least one set of rotating abrasive wheels and about which is located a sieve member, comprising the steps of forcibly projecting the edible vegetable material in a forced jet of a gas against the rotating abrasive wheels to be pulverized thereby, continuously passing the edible vegetable material which has been adequately pulverized from the grinding chamber through the sieve member and retaining the edible vegetable material which has not been adequately pulverized within the grinding chamber, continuously conveying the edible vegetable material which has not been adequately pulverized toward the rotating abrasive wheels and forcibly projecting the same in a forced jet of a gas against the rotating abrasive wheels for further pulverizing, and collecting the edible vegetable material which has been adequately pulverized and passed through the sieve member.

References Cited in the file of this patent

UNITED STATES PATENTS

| Number | Name | Date |
|---|---|---|
| 104,910 | Whelpley | June 28, 1870 |
| 291,018 | Ager | Jan. 1, 1884 |
| 826,174 | Koneman | July 17, 1906 |
| 1,089,818 | Burns | Mar. 10, 1914 |
| 1,121,631 | Hupp | Dec. 22, 1914 |
| 1,702,055 | Murray | Feb. 12, 1929 |
| 1,752,902 | Farner | Apr. 1, 1930 |
| 2,138,715 | Thorsen | Nov. 29, 1938 |
| 2,155,697 | Young | Apr. 25, 1939 |
| 2,499,590 | Konupek | Mar. 7, 1950 |
| 2,612,321 | Sidwell | Sept. 30, 1952 |
| 2,684,206 | Zettel | July 20, 1954 |

FOREIGN PATENTS

| Number | Country | Date |
|---|---|---|
| 1,736 | Sweden | June 12, 1889 |
| 407,740 | Germany | Jan. 2, 1925 |
| 505,430 | Great Britain | May 10, 1939 |
| 819,124 | France | July 5, 1937 |